United States Patent [19]

Ruckel et al.

[11] 3,839,243

[45] Oct. 1, 1974

[54] DIPENTENE/BETA-PINENE COPOLYMERS AND ELASTOMERS

[75] Inventors: Erwin Richard Ruckel, Darien; Ronald Frank Phillips, New Milford; Herbert George Arlt, Jr., Ridgefield, all of Conn.

[73] Assignee: American Cyanamid Company, Stamford, Conn.

[22] Filed: Feb. 26, 1973

[21] Appl. No.: 336,104

Related U.S. Application Data

[60] Division of Ser. No. 159,233, July 2, 1971, Pat. No. 3,737,418, which is a continuation-in-part of Ser. No. 76,348, Sept. 29, 1970, abandoned.

[52] U.S. Cl................ 260/3.3, 260/4, 260/28.5 A, 260/827, 260/874, 260/887, 260/888, 260/890, 260/896, 260/897 B
[51] Int. Cl..... C08c 11/70, C08c 13/00, C08d 3/04
[58] Field of Search .......... 260/3.3, 4, 28.5 A, 827, 260/874, 887, 888, 890, 896, 897 B

[56] References Cited

UNITED STATES PATENTS

| 2,320,716 | 6/1943 | Corkery et al. | 260/3.3 |
| 2,567,919 | 9/1951 | Burroughs | 260/88.2 D |
| 3,058,964 | 10/1962 | Samour | 260/88.2 D |
| 3,413,246 | 11/1968 | Weymann et al. | 260/88.2 D |
| 3,466,267 | 9/1969 | Derfer | 260/88.2 D |
| 3,470,145 | 9/1969 | Lipman | 260/88.2 D |

*Primary Examiner*—Murray Tillman
*Assistant Examiner*—J. Ziegler
*Attorney, Agent, or Firm*—Harry H. Kline

[57] ABSTRACT

A process for the production of a series of β-pinene/-dipentene copolymers is given whereby the ratio of the monomers are varied to produce a variety of polyterpene resins having utility as hot-melt coating compositions and pressure-sensitive adhesive compositions.

4 Claims, 1 Drawing Figure

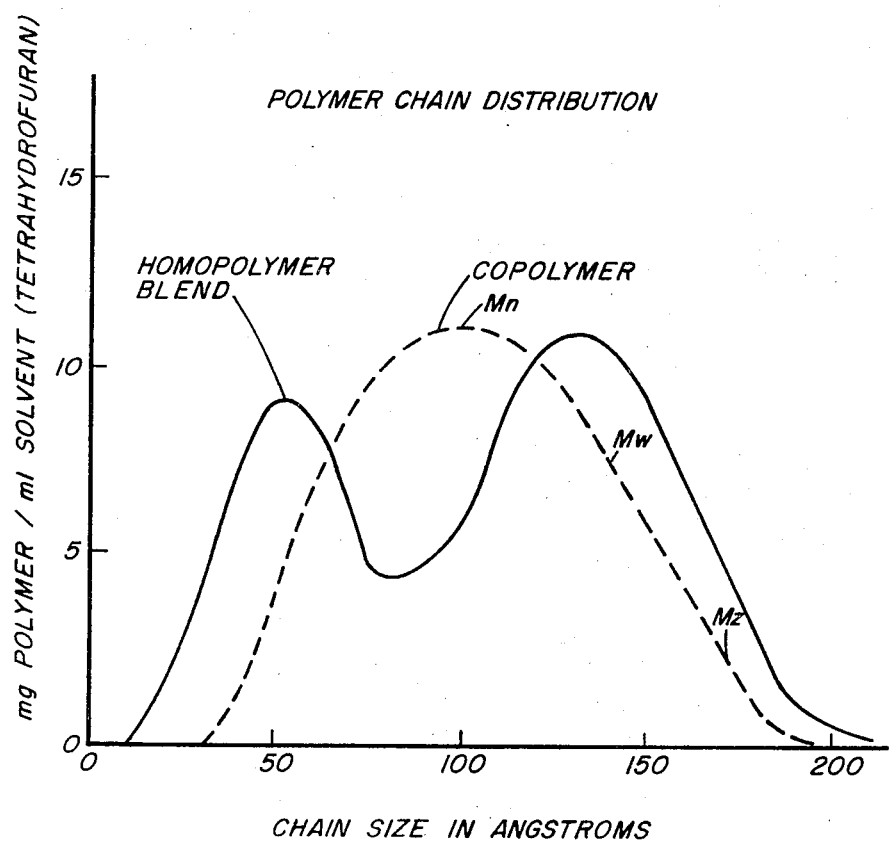

DIPENTENE/BETA-PINENE COPOLYMERS AND ELASTOMERS

The present application is a divisional of our copending application, Ser. No. 159,233, filed on July 2, 1971, now U.S. Pat. No. 3,737,418 issued on June 5, 1973, which patent is a continuation-in-part of our application, Ser. No. 76,348, filed on Sept. 29, 1970, now abandoned.

This invention relates to polyterpenes. More particularly, this invention relates to novel copolymers containing recurring units derived from varying proportions of $\beta$-pinene and dipentene, to a process for preparing the novel copolymers, and to adhesive compositions containing the novel copolymers.

Terpene polymers are well known in the art for use in compositions applied as hot-melt coatings or adhesives and as pressure-sensitive adhesives. The properties of specific terpene polymers vary widely and specific utility, i.e., hot-melt or pressure-sensitive applications, depends upon specific polymer properties. Hot-melt coatings, for example, should provide after cooling a smooth, clear coating which does not exude resin and is not tacky, adhering only to the surface upon which it is coated. A pressure-sensitive adhesive, on the other hand, must remain aggressively tacky and contactably adhesive in use.

Conventionally, polyterpenes used in hot-melt or pressure-sensitive applications are homopolymers of dipentene or $\beta$-pinene, respectively. Dipentene homopolymers provide high compatibility, excellent gloss, and low water vapor transmission to hot-melt coatings and, accordingly, are preferred in such application. Generally, their high melting points and stiffness render them unsuitable for use as pressure-sensitive adhesives. $\beta$-Pinene homopolymers, on the other hand, provide optimum tack and shear strength in pressure-sensitive adhesives and are preferred in such application. Their lower compatibility and higher water vapor transmission render them unsuitable for hot-melt coatings. Blends of homopolymers reflect the poorest properties of individual components in specific applications and result in inferior adhesives. A significant increase in use of pressure-sensitive adhesives has resulted in a short supply of $\beta$-pinene homopolymers.

$\beta$-Pinene is a natural product, occurring as a minor component of turpentine. Hackh's Chemical Dictionary, McGraw-Hill Book Company, New York, N.Y. U.S.A., Fourth Edition (1969), page 697, gives the following compositions (in percentages):

| Terpene | Gum Turpentine | Wood Turpentine | Sulfate Turpentine |
|---|---|---|---|
| $\alpha$-pinene | 60–65 | 75–80 | 60–70 |
| $\beta$-pinene | 25–35 | nil | 20–25 |
| camphene | — | 4–8 | — |
| other terpenes | 5–8 | 15–20 | 6–12 |

It is readily apparent, therefore, that in spite of the increased demand for $\beta$-pinene homopolymers, the supply of raw material for this use is essentially limited and insufficient to meet increasing demands.

Dipentene may either be a natural product, commonly known as limonene, or may be obtained synthetically by isomerization of $\alpha$-pinene.

With respect to reactivity in polymerizations, $\beta$-pinene is readily active while dipentene is relatively inactive. In polymerizations, $\beta$-pinene which has the structure

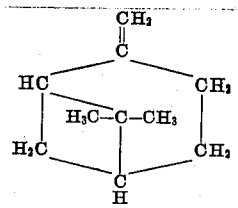

is reported, JACS, 72 (1950), pages 1226–1230, to provide a polymer having the recurring unit

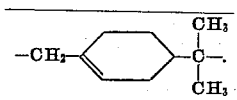

Dipentene, on the other hand, which has the structure

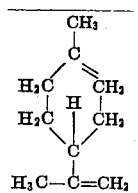

appears to polymerize both through the exocyclic and ring double bonds, resulting in a hydrocarbon backbone which contains crowded pendant rings as well as macrocyclic rings. These distinct polymer structures are thought to be responsible for differences in homopolymer properties observed and to result in the selective utility with respect to hot-melt and pressure-sensitive adhesives.

In accordance with the present invention there is provided a polyterpene comprising recurring units of the structure

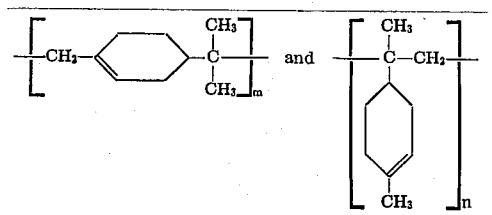

and $q$ secondary mer units of the dipentene mer which reflect involvement of the ring double bond, wherein $m$, $n$, and $q$ are integers which define a copolymer of molecular weight in the range of about 500 and 20,000 and wherein the ratio of $m$ to $n+q$ is from 19:1 to 1:19.

In accordance with the process aspect, there is provided a method for preparing the novel terpene copolymers which comprises: adding to a suitable solvent from 1 to 5 percent by weight of a suitable catalyst to form a reaction medium, said percentage being based on the total weight of monomer charge; adding to the catalyzed reaction medium, a monomer mixture of $\beta$-pinene and dipentene at a rate which will maintain the reaction temperature in the range of 30°C. to 65°C. in the presence of external cooling, the ratio of $\beta$-pinene to dipentene being in the range of 19:1 to 1:19, respectively; continuing addition of monomer mixture until the reaction medium contains from 20 to 60 percent by weight of terpenes, based on the total weight of terpenes and solvent; maintaining the reaction medium at the reaction temperature following complete monomer addition for a time sufficient to reduce the monomer content to substantially zero; and thereafter recovering the copolymer thus formed.

The adhesive composition provided by the present invention comprises from about 25 to about 75 percent of terpene copolymer of the present invention and, correspondingly, from about 75 to about 25 percent of elastomer, the percentages being by weight based on the total weight of copolymer and elastomer in the adhesive composition.

Copolymers of the present invention are useful in hot-melt and pressure-sensitive applications, specific utility depending upon the ratio of monomers in the copolymer. The copolymers provide improved properties in adhesive compositions over those obtained with a corresponding mixture of homopolymers. In fact, in certain properties of adhesives, the copolymers provide properties over those obtained with the homopolymer preferred in the application. Selected copolymers, by providing excellent properties in pressure-sensitive adhesives, reduce requirements for $\beta$-pinene, thereby enabling increased usage of pressure-sensitive adhesives to be achieved.

The copolymers of the present invention are obtained by copolymerization of $\beta$-pinene and dipentene monomers. The monomers employed may be in relatively pure form or may contain appreciable amounts of impurities, usually other terpenes which do not affect the polymerization product with respect to its utility in adhesive compositions. $\beta$-Pinene, for example, is available commercially in a form which constitutes about 80 percent $\beta$-pinene and 20 percent of other terpenes. Dipentene is available in a form which constitutes about 90 percent dipentene and 10 percent other terpenes. Either or both of these sources of monomer may be employed in preparing the desired copolymers, basing the monomer ratio in the monomer mixture on the amount of actual monomer present in the source. Purer monomer sources produce purer copolymers and are preferred where copolymer purity is desirable. As is apparent, the desired copolymers may contain from 95 to 5 percent, by weight, of $\beta$-pinene units and, correspondingly, from 5 to 95 percent, by weight of dipentene units. The copolymers generally contain recurring monomer units in proportions corresponding to the monomer ratio charged. Although the ratio of $n$ and $q$ is conveniently considered to be substantially equal, it is not required that such be the case. Presently available methods fo determining the ratio of $n$ and $q$ are incapable of establishing exact values therefor and lead only to the conclusion that at least some of the dipentene units also exhibit ring involvement in copolymer formation.

Copolymers having 50 percent or more of recurring $\beta$-pinene units are admirably suitable for use as pressure-sensitive adhesives. Copolymers having 50 percent or more of recurring dipentene units are admirably suited for use as hot-melt adhesives. Preferably, the copolymers for pressure-sensitive adhesives will contain 60 to 90 percent $\beta$-pinene, more preferably 60 to 80 percent $\beta$-pinene. A softening point of 115° to 120°C., Ring and Ball Method, ASTM-58T, is desirable. Preferably, the copolymers for hot-melt adhesives will contain from 60 to 95 percent dipentene. A softening point of 85°–115°C. is desirable. The copolymers generally will have molecular weights in the range of 500 to 20,000.

The solvents useful in preparing the copolymers of the present invention are generally aromatic hydrocarbons or chlorinated hydrocarbons. Typical solvents include benzene, toluene, p-xylene, mixed xylenes, ethyl benzene, and methylene dichloride. The amount of solvent employed is such as to provide a final reaction mixture which contains from about 20 to 60 percent of copolymer, by weight, based on the total weight of solvent and copolymer. Lower solvent usage can result in viscosity problems while higher solvent usage is unnecessary and wasteful.

As polymerization catalyst, there may be employed metal halides of the Friedel-Crafts type, for example, aluminum bromide, boron trifluoride, zirconium chloride, aluminum chloride, boron trifluoride-ethyl ether complex, and the like. The amount of catalyst may vary widely, depending upon its effectiveness. Generally, catalyst usage will be in the range of 1 to 5 percent, preferably 2 to 3 percent, by weight, based on the monomer charge. Lower catalyst usage is generally ineffective, while higher usage is uneconomical.

In initiating polymerization, the catalyst is slurried or dissolved in the solvent medium. Monomer mixture is then added gradually so as to maintain the desired temperature in conjunction with an external cooling source. The polymerization should be in the range of 30°C. to 65°C. to obtain the desired copolymers. Lower temperatures tend to lead to homopolymerization of $\beta$-pinene with dipentene substantially unpolymerized. Higher temperatures tend to lead to a narrow molecular weight distribution and low molecular weight copolymers unsuitable for use in adhesive compositions. The time duration of monomer addition will be influenced by the nature of the equipment employed and the ability to maintain the reaction temperature therewith.

After monomer addition is complete, maintenance of reaction temperature is desirable to ensure utilization of the monomer. A time period of 15 to 60 minutes is adequate for this purpose. Shorter time periods tend to be inadequate and longer time periods are unnecessary.

Recovery of the copolymer from the reaction medium may be by any suitable procedure. Distillation or evaporation of solvent at atmospheric or subatmospheric pressure is a convenient procedure. Generally, after an initial distillation to remove the bulk of solvent, a subsequent steam distillation is employed to remove the last traces of solvent. In addition, when desired, the copolymer may be dehydrohalogenated in accordance with conventional procedures.

In order to verify the nature of the polymer obtained by the present invention, it was subjected to gel permeation chromatography in accordance with the general procedure described by Pietila, Sivola, and Sheffer, Journal of Polymer Science, Part A-1, Vol. 8 (1970), pages 727-737. FIG. 1 is a graph representing polymer chain distribution. The solid line indicates polymer chain distribution of a blend containing 60 parts of β-pinene homopolymer and 40 parts of dipentene homopolymer. The shape of the solid line is such as to have two peaks, typical of polymer blends. The dashed line indicates polymer chain distribution of a polymer of the present invention obtained by copolymerization of a monomer charge of 60 parts of β-pinene and 40 parts of dipentene. The shape of the dashed line is such as to have a single peak, characteristic of a true copolymer. The values $M_n$, $M_w$, and $M_z$ on the dashed line typify number average, weight average and z average molecular weights of the copolymer and are particular measures of molecular weight distribution. The z average molecular weight indicates the average molecular weight of those polymer chains which constitute the 10 percent of the polymer chains which are longest.

Although the gel permeation chromatography studies prove the polymer structure to be that of a true copolymer, it does not indicate the order of arrangement of recurring units of β-pinene and dipentene. Since numerous arrangements are possible and probable, it is to be expected that the various arrangements will occur at least to some extent. Although not wishing to be held to any particular theory as to the arrangement of recurring monomer units, it is expected that the arrangement is more random than ordered. It is to be understood that minor amounts of certain linkages may also occur in the copolymers as a result of impurities which may be present in the starting monomers or arise from solvent or catalyst interactions and the like.

In preparing adhesive compositions using the copolymers of the present invention, consideration is given to the copolymer composition. If the copolymer has the proper composition for the use intended it may be so used regardless of the softening point of the copolymer. However, should it be desired that the copolymer have a higher softening point, it is only necessary to subject the copolymer to additional steam distillation to effect this result. Such steam distillation will remove low molecular weight polymer fractions (dimer and trimer) from the copolymer and result in increased softening point. The increase in softening point will be directly proportional to the amount of volatiles (low molecular weight polymer fractions) removed.

For pressure-sensitive adhesives, copolymers of high β-pinene content are employed. In formulating the adhesive, a suitable elastomer in solvent therefor is selected and the copolymer added thereto. Conventional procedures for formulation and application are employed. After application, the solvent evaporates leaving the adhesive composition of the present invention. The elastomers employed in this application preferably are rubbers, natural, synthetic, or mixtures thereof. Suitable rubbers are those having sufficient flexibility for the application intended. Suitable rubbers, for example, include cis-1,4-polyisoprene (natural rubber), and synthetic rubbers such as styrene-butadiene, acrylonitrile-butadiene, polyisobutylene, poly(isoprene-isobutylene), polychloroprene, silicones, polyvinyl ether, chlorinated rubber, and the like, which may be plasticized or unplasticized. The principal components of the adhesive are copolymer and elastomer. The principal components are present in amount which range from 25 to 75 percent of copolymer and, correspondingly, 75 to 25 percent of elastomer, the percentages being by weight based on the total weight of elastomer and copolymer. Provision for solvent content and other additives, for example, stabilizers for the elastomer, are in accordance with conventional procedures and form no part of the present invention.

For hot-melt adhesives, copolymers of high dipentene content are employed. In formulating the adhesive, a suitable elastomer is selected to form the comelt. Although additional ingredients may be employed, their use is not critical to success of the adhesive. Conventionally, use of a diluent or extender, such as wax, is made and such use is contemplated in the present instance. The principal components of the adhesive, again, are the copolymer and elastomer. Usage of principal components is as in the case of pressure-sensitive adhesives. In the case of hot-melt adhesives, however, the choice of elastomer differs from that of pressure-sensitive adhesives. The preference for hot-melt elastomers is to an elastomer which is less flexible, i.e. stiffer, than that selected for pressure-sensitive adhesives. Thus, in the hot-melt adhesives, the elastomers are generally unplasticized and may include such polymers as polyethylene, polypropylene, polyvinyl acetate, copolymers of ethylene and vinyl acetate, polyisocyanates and the like.

The invention is illustrated by the examples which follow, in which all parts and percentages are by weight unless otherwise specifically designated.

EXAMPLE 1

To 500 milliliters of p-xylene, there were added 18 grams of anhydrous aluminum chloride. The mixture was stirred and provisions for external cooling were made. Addition of 600 grams of a monomer mixture consisting of 86 percent β-pinene and 14 percent dipentene was begun. When the reaction temperature reached 45°C., external cooling was initiated and further monomer additions were at a rate such that the temperature remained at 45°C. Approximately one hour was required to complete monomer addition. After monomer addition was complete, the reaction mixture was maintained at 45°C. for an additional 30 minutes. The aluminum chloride was then removed by washing the xylene solution with 2 percent aqueous hydrochloric acid followed by deionized water washes until the wash water was neutral. The xylene was then removed by vacuum distillation. Yield of copolymer was 95-98 percent. Properties of the copolymer are given in Table I.

EXAMPLES 2-7

Following the procedure of Example 1 in every material detail, a series of copolymers was prepared. In each example, a monomer mixture of different proportions of β-pinene and dipentene was employed. In each instance, copolymer yield was 95-98 percent. The monomer mixtures employed and copolymer properties are given in Table I.

Table I

Copolymer Properties

| Example | Ratio: β-pinene to Dipentene[1] | Softening Point[2] (°C.) | Molecular Weight Values | | |
|---|---|---|---|---|---|
| | | | $M_n$ | $M_w$ | $M_z$ |
| 1 | 86:14 | 122 | 1570 | 3140 | 6090 |
| 2 | 78:22 | 118 | 1020 | 2390 | 5880 |
| 3 | 69:31 | 115 | 929 | 2050 | 4800 |
| 4 | 60:40 | 110 | 900 | 1870 | 4450 |
| 5 | 51:49 | 108 | 850 | 1500 | 3500 |
| 6 | 43:57 | 100 | 770 | 1200 | 2800 |
| 7 | 25:75 | 95 | 630 | 1150 | 2300 |

Notes:
[1] The ratio of monomers in the feed and in the copolymer are substantially the same in each instance.
[2] Ball and Ring Method, ASTM E 28–58T.
$M_n$ — Number average molecular weight
$M_w$ — Weight average molecular weight
$M_z$ — Z average molecular weight Examples 1–7, inclusive, illustrate copolymers of the present invention and a process for preparation thereof.

COMPARATIVE EXAMPLES A – C

In order to illustrate properties of homopolymer blends, commercially available β-pinene and dipentene polymers were obtained. Polymer blends were obtained by melting and mixing the components in the proportions specified in Table II. Table II indicates the properties of the polymer blends.

Table II

Blend Properties

| Comp. Ex. | Ratio: β-pinene to Dipentene[1] | Softening Point[2] (°C.) | Molecular weight Values | | |
|---|---|---|---|---|---|
| | | | $M_n$ | $M_w$ | $M_z$ |
| A | 60:40 | 118 | 1045 | 2865 | 6700 |
| B | 51:49 | 115 | 1010 | 2800 | 6950 |
| C | 43:57 | 120 | 902 | 2470 | 6400 |

Notes:
[1] Ratio in blend
[2] Ring and Ball Method
Molecular Weight Values — See Table I

EXAMPLE 8

The copolymers of Examples 1–7 were evaluated as pressure-sensitive adhesives in a formulation containing the following:

100 parts of a commercially obtained polyisoprene previously milled to a Mooney viscosity of 50
75 parts copolymer
1 part commercial antioxidant.

The formulations were utilized to prepare pressure-sensitive tapes according to conventional procedures. The tapes were then evaluated according to standard test procedures of the Pressure-sensitive Tape Council.

For comparison purposes, similar formulations were prepared of the homopolymer blends and tapes prepared therewith were similarly tested.

Results of the test evaluations are given in Table III.

Table III

Evaluation of Pressure-Sensitive Adhesives

| Polyterpene of Example | Ratio: β-pinene to Dipentene | Shear Adhesion[1] | Tack[2] | 180° Peel Adhesion[3] |
|---|---|---|---|---|
| 1 | 86:14 | 84 min. | 8.6 in. | 40 oz/in. |
| 2 | 78:22 | 75 | 5.0 | 38 |
| 3 | 69:31 | 50 | 3.1 | 36 |
| 4 | 60:40 | 45 | 2.8 | 34 |
| A | 60:40 | 36 | 1.2 | 32 |
| 5 | 51:49 | 40 | 2.3 | 32 |
| B | 51:49 | 34 | 1.0 | 30 |
| 6 | 43:57 | 34 | 1.5 | 29 |
| C | 43:57 | 32 | 1.0 | 28 |
| 7 | 25:75 | 28 | 1.0 | 28 |

[1] Test Method PSTC-2, Modified so Adhesive-Metal Contact Angle is 20°
[2] Test Method PSTC-18
[3] Test Method PSTC-1

The data reported in Table III indicate that the formulations based on the copolymers of Examples 1–5, inclusive, are desirable as pressure-sensitive adhesives. The formulation containing the blend of Comparative Example A has unsuitable values of tack and shear adhesion to be desirable as a pressure-sensitive adhesive. A homopolymer of β-pinene, not shown, did not impart sufficient tack to the formulation to be useful as a pressure-sensitive adhesive. Formulations based on Examples 6 and 7 and Comparative Examples B and C also have unsuitable values of tack and shear adhesion to be considered for use as pressure-sensitive adhesives.

EXAMPLE 9

The copolymers of Examples 1-7 were evaluated for potential use as hot-melt adhesives in a formulation containing the following:
1 part copolymer
2 parts commercially available copolymer of ethylene and vinyl acetate
2 parts microcrystalline wax.

The ingredients are melted together to form a clear mixture and then allowed to cool gradually. The temperature at which cloudiness appears is noted and this temperature is designated as the cloud point. To be acceptable for use as a hot-melt adhesive the cloud point should not exceed 110°C.

For comparison purposes similar formulations were prepared of the homopolymer blends and similarly tested for cloud point.

Results of the various tests are reported in Table IV.

Table IV

Properties of Hot-Melt Adhesives

| Polyterpene of Example | Ratio: β-pinene to Dipentene | Cloud Point (°C.) |
|---|---|---|
| 1 | 86:14 | 200 |
| 2 | 78:22 | 175 |
| 3 | 69:31 | 160 |
| 4 | 60:40 | 150 |
| 5 | 51:49 | 140 |
| 6 | 43:57 | 110 |
| 7 | 25:75 | 95 |
| A | 60:40 | 200 |
| B | 51:49 | 175 |
| C | 43:57 | 170 |

The data of Table IV show that only copolymers of Examples 6 and 7 are suitable for use as hot-melt adhesives. It is to be noted that homopolymer blends have significantly higher cloud points than copolymers of the same ratio of β-pinene to dipentene.

EXAMPLE 10

The copolymers of Examples 3-7 were subjected to steam distillation until a loss in weight of 4 percent was obtained in each instance. The effect of such steam distillation upon the softening point of the copolymers is shown in Table V.

Table V

Steam Distilled Copolymers

| Copolymer of Example | Ratio: β-pinene to Dipentene | Softening Point (°C.) Initial | Softening Point (°C.) Steam-Distilled[1] |
|---|---|---|---|
| 3 | 69:31 | 115 | 125 |
| 4 | 60:40 | 110 | 120 |
| 5 | 51:49 | 108 | 118 |
| 6 | 43:57 | 100 | 110 |
| 7 | 25:75 | 95 | 105 |

[1] To 4% weight loss.

This example illustrates the effect of a subsequent steam distillation step in raising the softening point of copolymers of the present invention. When steam distillation is carried out to raise the softening point of homopolymers of dipentene, a considerably greater loss in yield is required to effect a similar increase in softening point.

We claim:

1. An adhesive composition comprising a polyterpene consisting essentially of recurring units of the structure:

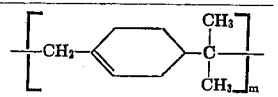

and

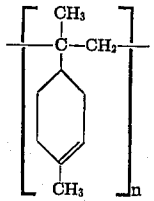

and $q$ secondary mer units of the dipentene mer which reflect involvement of the ring double bond, wherein $m$, $n$, and $q$ are integers which define a copolymer of molecular weight in the range of about 500 and 20,000 and wherein the ratio of $m$ to $n+q$ is from 19:1 to 1:19 and an elastomer, said elastomer being present in the amount of 25 to 75 percent, by weight, based on the total weight of polyterpene and elastomer.

2. A pressure-sensitive adhesive composition comprising the polyterpene of claim 1 wherein the ratio of $m$ to $n+q$ is between 9:1 and 3:2 and an elastomer, said elastomer being present in the amount of 25 to 75 percent, by weight, based on the total weight of polyterpene and elastomer.

3. A hot-melt adhesive composition comprising the polyterpene of claim 1 wherein the ratio of $m$ to $n+q$ is between 1:1 and 1:19 and an elastomer, said elastomer being present in the amount of 25 to 75 percent, by weight, based on the total weight of polyterpene and elastomer.

4. The composition of claim 3 containing in addition a wax extender.

* * * * *